United States Patent
Ueshima

(10) Patent No.: US 8,774,377 B2
(45) Date of Patent: Jul. 8, 2014

(54) CALL RECEIVING DEVICE, CALL RECEIVING METHOD, AND CALL RECEIVING PROGRAM

(75) Inventor: Yasushi Ueshima, Tokyo (JP)

(73) Assignee: Comsquare Co., Ltd., Tokyo (JP)

( * ) Notice: Subject to any disclaimer, the term of this patent is extended or adjusted under 35 U.S.C. 154(b) by 366 days.

(21) Appl. No.: 12/731,154

(22) Filed: Mar. 25, 2010

(65) Prior Publication Data

US 2010/0177878 A1 Jul. 15, 2010

Related U.S. Application Data

(63) Continuation of application No. PCT/JP2007/068540, filed on Sep. 25, 2007.

(51) Int. Cl.
 *H04M 15/00* (2006.01)
 *G06Q 30/00* (2012.01)

(52) U.S. Cl.
 USPC .................................. 379/114.13; 705/14.46

(58) Field of Classification Search
 USPC ....................................................... 379/142.06
 See application file for complete search history.

(56) References Cited

U.S. PATENT DOCUMENTS

| 6,687,242 | B1 * | 2/2004 | Enzmann et al. ............. 370/352 |
| 2003/0147519 | A1 * | 8/2003 | Jain et al. .................. 379/211.02 |
| 2005/0074102 | A1 | 4/2005 | Altberg et al. |
| 2007/0116217 | A1 | 5/2007 | Altberg et al. |
| 2008/0130843 | A1 | 6/2008 | Ueshima |
| 2008/0275785 | A1 * | 11/2008 | Altberg et al. .................. 705/14 |
| 2011/0158394 | A1 * | 6/2011 | Strietzel ...................... 379/93.12 |
| 2011/0310891 | A1 * | 12/2011 | Howe et al. .................... 370/352 |
| 2012/0002797 | A1 * | 1/2012 | Henry ...................... 379/201.02 |

FOREIGN PATENT DOCUMENTS

| JP | 11-317817 | 11/1999 |
| JP | 2001-275160 | 10/2001 |
| JP | 2005-115945 | 4/2005 |
| WO | WO 2007/015531 | 2/2007 |
| WO | WO 2009/040881 | 4/2009 |

OTHER PUBLICATIONS

International Search Report for International Application No. PCT/JP2007/068540, Jan. 29, 2008.
Written Opinion of the International Searching Authority for International Application No. PCT/JP2007/068540, Jan. 29, 2008.
Extended European Search Report for corresponding EP Application No. 07828357.9-1238, Jun. 4, 2012.

\* cited by examiner

*Primary Examiner* — Fan Tsang
*Assistant Examiner* — Solomon Bezuayehu
(74) *Attorney, Agent, or Firm* — Ditthavong & Steiner, P.C.

(57) ABSTRACT

A call receiving device includes an identification information acquisition part configured to acquire identification information by receiving calls each made based on identification information that is explicitly or implicitly provided in a web page and that identifies a call receiver. An information associating part is configured to associate the acquired identification information with discrimination information to discriminate each of the calls. A call connection part is configured to connect each of the calls to the call receiver. A discrimination information sending part is configured to send the discrimination information to the call receiver through the call connected to the call receiver. A discrimination information receiving part is configured to receive the discrimination information input into a predetermined device. A call related information sending part is configured to send, to the predetermined device, call related information indicated by the identification information associated with the discrimination information.

8 Claims, 12 Drawing Sheets

FIG. 3

| Advertiser | Advertiser phone number | Advertisement information | Identification information | Management ID | | | | |
|---|---|---|---|---|---|---|---|---|
| | | | | MID | DID | SID | PID | UID |
| qq corporation | 03-aaaa-bbbb | ~For pp, leave it to qq corporation~ | 0125423-0011002553 | 123 | 234 | 345 | 456 | 561 |
| yy shop | 045-ccc-dddd | ~For xx, leave it to yy shop~ | 0125423-0011002554 | 123 | 234 | 345 | 456 | 562 |
| bb office | 06-eeee-ffff | ~For aa, leave it to bb office~ | 0125423-0011002555 | 123 | 234 | 345 | 456 | 563 |
| ... | ... | ... | ... | ... | ... | ... | ... | ... |

FIG. 6

Dictionary database

| Akai (red) | 21 |
| Aoi (blue) | 21 |
| Shiroi (white) | 21 |
| Kuroi (black) | 21 |
| ⋮ | |
| Inu (dog) | 21 |
| Neko (cat) | 21 |
| Tori (bird) | 21 |
| Saru (monkey) | 21 |
| ⋮ | |

FIG. 8

Database of related information D4

| Identification information | Call-related information ||||||| Discrimination information |
| | Personal information || Management ID ||||  |
| | Delivery-destination information | Payment information | MID | DID | SID | PID | UID | |
|---|---|---|---|---|---|---|---|---|
| 0125423-0011002553 | XXX | XXX | 123 | 234 | 345 | 456 | 561 | 1 |
| 0125423-0011002554 | YYY | YYY | 123 | 234 | 345 | 456 | 562 | 2 |
| 0125423-0011002555 | ZZZ | ZZZ | 123 | 234 | 345 | 456 | 563 | 3 |
| ... | ... | ... | ... | ... | ... | ... | ... | ... |

11 Identification information
19 Database of related information
22 Personal information
23 Delivery-destination information
24 Payment information
14 Management ID
14p MID
14q DID
14q SID (14q)
14r PID
14s (Management ID label)
14t UID
18 Discrimination information

FIG. 11

Pay Per Call System

Login Information

Login ID : *****

Previous Login 2007-7-1 08:11:05

Call Record

| Call starting time | Call ending time | Call duration |
|---|---|---|

| Entry field for discrimination information | Identification Information | Advertiser | Advertisement information | Advertisement-providing site | Merchandise | Caller's phone number | Caller's name | Delivery destination | Credit information |
|---|---|---|---|---|---|---|---|---|---|
| 1 | ... | ... | ... | ... | ... | ... | ... | ... | ... |
| 2 | ... | ... | ... | ... | ... | ... | ... | ... | ... |

CALL RECEIVING DEVICE, CALL RECEIVING METHOD, AND CALL RECEIVING PROGRAM

CROSS-REFERENCE TO RELATED APPLICATIONS

The present application is a continuation application of International Application No. PCT/JP2007/068540, filed Sep. 25, 2007. The contents of this application are incorporated herein by reference in their entirety.

BACKGROUND OF THE INVENTION

1. Field of the Invention

The present invention relates to a call receiving device, a call receiving method, and a call receiving program.

2. Discussion of the Background

Pay-per-click systems have been used as one method of advertising using web pages on the Internet. A pay-per-click system is a system in which an advertising agency charges an advertisement fee to an advertiser according to the number of times an item of advertisement information displayed on a web page is clicked.

For example, when advertisement information of the advertiser is posted on a web page of an advertisement providing site and a user who has viewed the page selects (clicks) the advertisement information, a website managed by the advertiser is linked to and the user can view detailed information regarding the advertisement information. In addition, according to the number of clicks made on the advertisement information, the advertiser pays an advertisement fee to the administrator of the portal site.

This method is frequently used in portal (entrance) sites that have many users (viewers) and are capable of providing high advertising effectiveness. The administrator of the portal site establishes frames for advertisements as part of the site page, runs advertisements by lending the frames for advertisements to advertisers, and collects advertisement fees according to the number of clicks made on each item of advertisement information.

However, this pay-per-click system has a problem in that, when an advertiser does not have their own site, no site can be set to be linked to and no detailed information regarding the advertisement information can be provided. Moreover, because payment of an advertisement fee is generated simply through clicks made on advertisement information, the effect of "direct contact with users (clients)" cannot be obtained for the cost of advertising.

Moreover, because the advertisement fee is generated according to the number of clicks made even when a user unintentionally clicks the advertisement information or intentionally repeats clicking, the association between the advertising effectiveness and the advertisement fee may be decreased.

Therefore, another system has been suggested in which a phone number corresponding to each advertiser is posted on a web page of an advertisement providing site along with the advertisement information, and when a user who has seen the information calls the advertiser, an advertisement fee is charged based on the establishment of the phone call. One of the systems using this advertising method is referred to as a Pay-Per-Call system, such as the one described in Japanese Patent Application Publication (KOKAI) No. 2005-115945, for example.

However, when posting advertisement information on a plurality of advertisement providing sites, if all of the posted phone numbers are uniformly the same number, it is impossible to distinguish which advertisement providing site the user has seen to make the phone call. Therefore, there is a problem in that it is impossible to ascertain which advertisement providing sites have high advertising effectiveness and which advertisement providing sites have low advertising effectiveness.

Therefore, another method has been suggested in which different phone numbers are allocated for each item of advertisement information and posted on different advertisement providing sites in order to ascertain, based on the phone number the user calls, which advertisement providing sites the user has seen to make the phone call (e.g., refer to WO2007/015531).

Based on the posting of advertisement information according to this pay-per-call system, for example, a call of inquiry may be made at midnight by a user. However, if that time falls within non-business hours, the advertiser cannot respond directly to the call being made. Therefore, in recent years, depending on the time, the call from the user may be transferred to, for example, an agent specializing in phone-receiving businesses that are referred to as a call center, and the call center responds to the call.

If the call from the user is transferred to this call center, a call responder is necessary to ascertain the details of the user's call regarding the relevant merchandise and where it is posted. In addition, if the user wishes to purchase the merchandise, various items of information must be ascertained, such as payment information related to the purchase and delivery-destination information for delivering the merchandise.

However, in the method in which a receptionist ascertains merchandise information, etc. by inquiring about the merchandise information, advertisement information etc. from the user over the phone, information transmission is not secured because the user may misspeak and/or the receptionist may mishear the information. The merchandise information etc. is associated with the phone number of the user, and it may be possible to reliably ascertain the merchandise information etc. if the receptionist ascertains the phone number. However, because the phone number is typically numeric information with a plurality of digits and, in some cases, may be numeric information with approximately 17 digits, it is still difficult for the receptionist to reliably ascertain a plurality of items of numeric information.

SUMMARY OF THE INVENTION

According to one aspect of the present invention, a call receiving device includes an identification information acquisition part, an information associating part, a call connection part, a discrimination information sending part, a discrimination information receiving part, and a call related information sending part. The identification information acquisition part is configured to acquire identification information by receiving calls each made based on the identification information that is explicitly or implicitly provided in a web page and that identifies a call receiver. The information associating part is configured to associate the acquired identification information with discrimination information to discriminate each of the calls. The call connection part is configured to connect each of the calls to the call receiver. The discrimination information sending part is configured to send the discrimination information to the call receiver through the call connected to the call receiver. The discrimination information receiving part is configured to receive the discrimination information input into a predetermined device. The call related information sending part is configured to send, to the predetermined device, call related information indicated by the identification information associated with the discrimination information.

According to another aspect of the present invention, a call receiving method includes acquiring identification information by receiving calls each made based on the identification information that is explicitly or implicitly provided in a web page and that identifies a call receiver. The acquired identification information is associated with discrimination information to discriminate each of the calls. Each of the calls is connected to the call receiver. The discrimination information is sent to the call receiver through the call connected to the call receiver. The discrimination information input into a predetermined device is received. Related information indicated by the identification information associated with the discrimination information is sent to the predetermined device call.

According to still another aspect of the present invention, a call receiving program causes a computer to perform acquiring identification information by receiving calls each made based on the identification information that is explicitly or implicitly provided in a web page and that identifies a call receiver. The acquired identification information is associated with discrimination information to discriminate each of the calls. Each of the calls is connected to the call receiver. The discrimination information is sent to the call receiver through the call connected to the call receiver. The discrimination information input into a predetermined device is received. Related information indicated by the identification information associated with the discrimination information is sent to the predetermined device call.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a data structure diagram of an information management database built in the advertisement server shown in FIG. 1;

FIG. 6 is a data structure diagram of a dictionary database built in the call receiving server shown in FIG. 1;

FIG. 8 is a data structure diagram of a database of related information created in the call receiving server shown in FIG. 1;

FIG. 11 is an example of a screen for a web browser displayed in the display screen of the call center server shown in FIG. 10.

DESCRIPTION OF THE EMBODIMENTS

Figure 1:
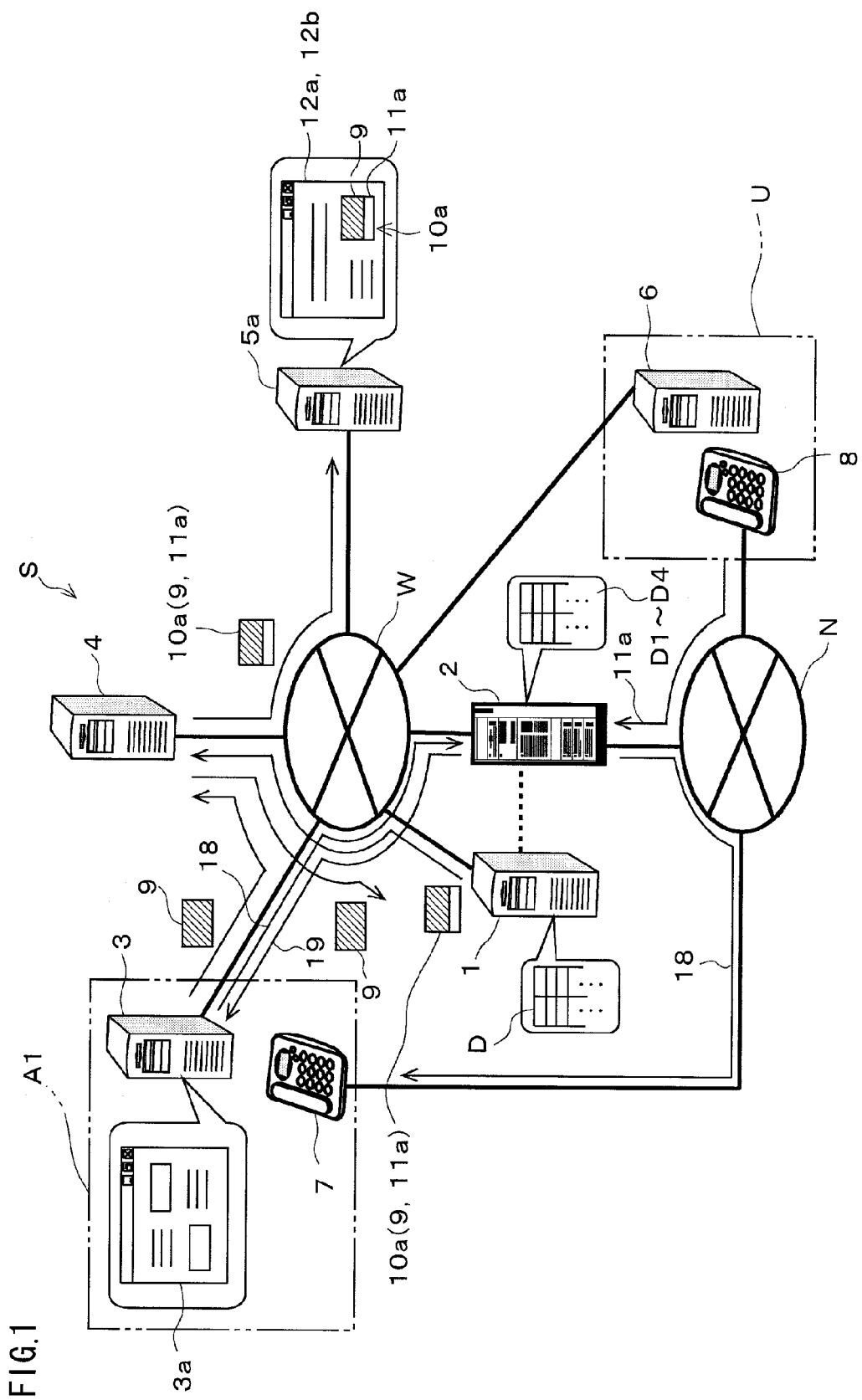
FIG. 1 is a schematic block diagram showing the overall configuration of an advertisement system composed of a call receiving server according to Embodiment 1 of the present invention.

The embodiments will now be described with reference to the accompanying drawings, wherein like reference numerals designate corresponding or identical elements throughout the various drawings.

Herein, "explicitly or implicitly provided in a web page" includes cases in which identification information is explicitly displayed as character information on a web page. It also includes situations in which the information is not explicitly displayed on a web page but is potentially associated with data of that web page and may be explicitly provided based on some manipulation of the web page, as well as situations in which it is possible to make a call to the call receiver associated with the identification information.

Identification information is information that identifies a call receiver by being associated with the call receiver and is composed of, for example, numbers with multiple digits. The identification information also associated with advertisement information, for example, and different identification information may be allocated to each item of advertisement information.

Call related information is information that includes various types of information related to a call and differs from call by call and is indicated by identification information. The call related information may include caller information. The caller is a user making a call, and caller information may include delivery-destination information, such as the user's phone number, name, and address, as well as payment information, such as a credit card number.

The provider information is information that indicates an advertising agent providing an advertiser's advertisement information on a web page along with the identification information, for example. The client information is information that indicates the actual web page in which the advertisement information and the identification information are explicitly or implicitly provided, for example. The merchandise information is information that indicates merchandise (product or service) related to the advertisement information provided along with the identification information, for example.

Numeric information with a predetermined number of digits or less is, for example, one-digit numbers such as "1" or "2" or numbers with two digits or less, such as "11" or "12". In addition, character information with a predetermined number of characters or less is, for example, character information with three characters or less, such as "aoi (blue)", "akai (red)", "inu (dog)", and "neko (cat)".

Embodiment 1

A call receiving server (call receiving device) 2 according to Embodiment 1 of the present invention will now be described with reference to the drawings. FIG. 1 is a schematic block diagram showing the overall configuration of an advertisement system S composed of this call receiving server 2. In the present specification, a server means a server computer, and a site (a website and an Internet site are also generally synonymous) means a collective entity of web pages built virtually within the server. A web page can be specified by a URL (Uniform Resource Locator) and is a virtual-information providing medium in which various types of information, such as character information and image information, are posted. Herein, "posting on a website" is used in a synonymous manner with "posting on a web page", and "viewing a website" is used in a synonymous manner with "viewing a web page".

In addition, in the present Embodiment 1, a case is described in which advertisement information 10a is posted on an advertisement providing site (website) 12a as an information-providing medium. However, the present invention is also applicable in cases in which the advertisement information is posted on a publication as an information-providing medium and in cases in which the advertisement information is broadcast on a broadcasting medium as an information-providing medium, etc.

This advertising system S is roughly configured with an advertisement server 1 and a call receiving server (call receiving device) 2, and the advertisement server 1 is connected to an advertiser's server (predetermined device) 3, an agent server 4, an advertisement providing server 5a, and a user's computer 6 via the Internet W in a manner that allows information to be sent and received. The advertiser (call receiver) A1 and the user (caller) U have an advertiser's phone (call receiver's calling equipment) 7 and a user's phone (caller's calling equipment) 8, respectively, which are connected to the call receiving server 2 via a telephone network N.

Described separately below are a process leading to providing advertisement information in the advertisement providing server 5a (process of providing advertisement information), a process for receiving a call from a user U who has come into contact with the advertisement information and connected to an advertiser A1 (call connecting process), and a process to send call related information 19 to an advertiser's server 3 (process of sending call related information).

In addition, in this advertising system S, a Pay-Per-Call system is employed. If the advertiser A1 wishes to provide their own advertisement information 10a, they prepare a contract with an advertising agent regarding the provision of an advertisement and request the advertising agent to provide the advertisement information 10a. Then, the advertising agent posts the requested advertisement information 10a on a website managed by the agent or an advertisement providing site 12a managed by an associated advertisement provider. If there is a call from a user U based on the posted advertisement information 10a, the advertising agent charges the advertiser A1 for an advertisement fee based on the understanding that the provision of the advertisement information 10a had advertising effectiveness.

<Process of Providing Advertisement Information>

The advertiser's server 3 is a server computer managed by the advertiser A1, wherein an advertiser's website (advertiser's site) 3a is built internally. When the advertiser A1 sends a banner image 9 for the advertisement information from this advertiser's server 3 to the agent server 4, the banner image 9 is forwarded from the agent server 4 to the advertisement server 1 described below.

An identification-information database (not shown) is stored in the advertisement server 1, and one item of identification information 11a (described below) may be extracted from the identification-information database and synthesized on the banner image 9 received. Then, in the advertisement server 1, the banner image 9 and identification information 11a are combined, associated with a management ID 14a (described below), and returned to the agent server 4 as advertisement information 10a. The advertisement information 10a is sent from the agent server 4 to the advertisement providing server 5a.

Figure 2:
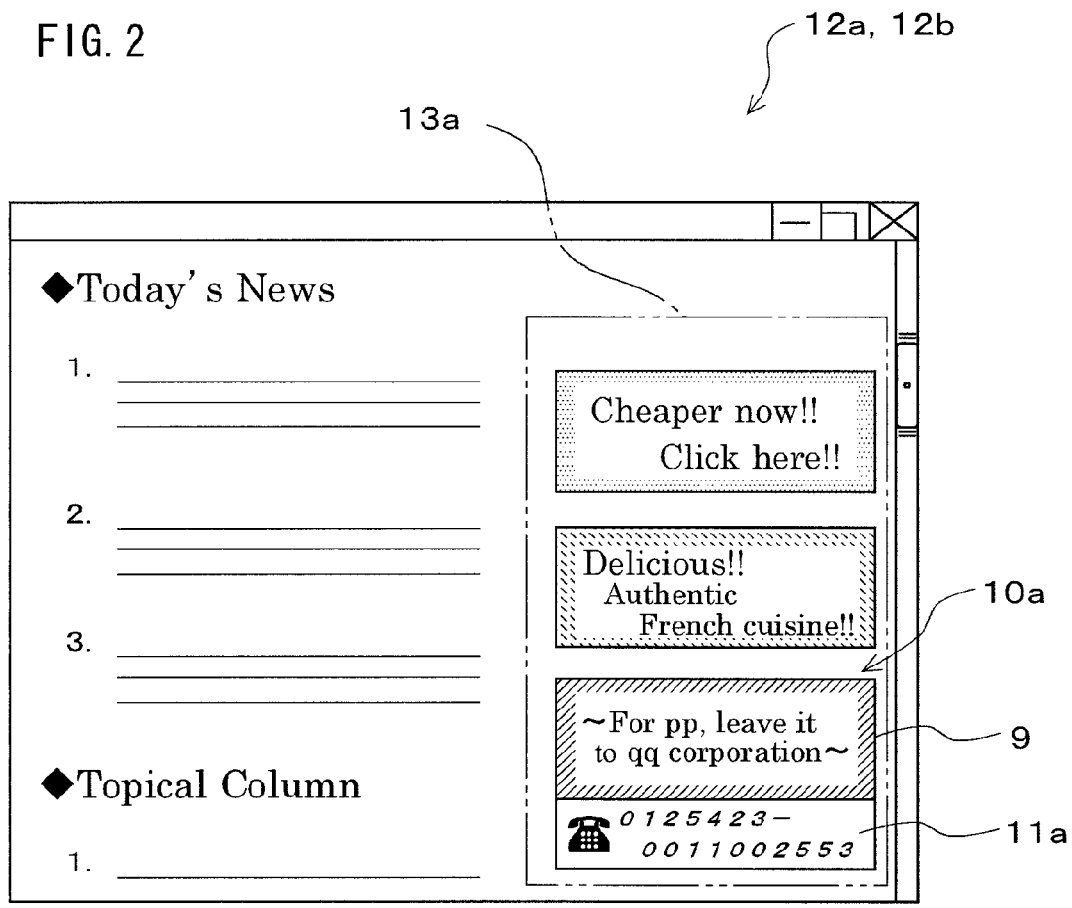
FIG. 2 is an example of a display screen for a web page of an advertisement providing site built in the advertisement providing server shown in FIG. 1.

In the advertisement providing server 5a, as shown in FIG. 2, the received advertisement information 10a is posted within an advertisement frame 13a configured on an advertisement providing page (web page) 12b of the advertisement providing site 12a. Then, when the user U who has come into contact with this advertisement information 10a by accessing the advertisement providing server 5a using the user's computer 6 makes a call with the user's phone 8 based on the identification information 11a, the call will be received by the call receiving server 2.

As shown in FIG. 3, an information management database D is stored in the advertisement server 1. This information management database D is built by mutually associating the advertiser A, an advertiser phone number B, the advertisement information 10, the identification information 11, and the management ID 14.

The identification information 11 is information for identifying the advertiser A1 as a call receiver and is typically a 17-digit phone number allocated to the advertiser A1 (e.g., "0125423-0011002553"). This phone number is configured with a server identification number in the first 7 digits and an advertisement identification number in the latter 10 digits, for example. Specifically, when the user U calls the phone number indicated by the identification information 11, the call is connected to the advertiser A1, thereby allowing the phone call to the advertiser A1 to be made.

Of course, the identification information 11 is not limited to 17-digit phone number information and may be 2- to 4-digit information that is a part of a phone number or may be an input number of a few digits for the user U to input into the destination server after making the call. Moreover, if the destination server has a voice-recognition function, the identification information 11 may also be a keyword for the user U to say during the call.

The management ID 14 is information allocated to each item of the advertisement information 10 for managing accounts. For calls based on the identification information 11, information such as history information and call durations is managed for each management ID 14, and those items of information are used in calculating the advertisement fees to be charged. This management ID 14 is composed of, for example, advertiser information (advertiser ID, hereinafter referred to as MID) 14p indicating the advertiser corresponding to the advertisement information, advertising agent information (advertising agent ID, hereinafter referred to as DID) 14q indicating the advertising agent conducting business by providing the advertising information based on a contract with the advertiser, merchandise information (merchandise ID, hereinafter referred to as PID) 14r indicating an item of merchandise related to the advertisement information, and advertisement providing site information (advertisement providing site ID, hereinafter referred to as SID) 14s of the website in which the advertisement information is posted.

Specifically, the management ID 14 allows for identifying advertisement information for merchandise related to an advertiser posted on an advertisement providing site managed by an advertising agent. Furthermore, if the management ID 14 includes personal page information (personal ID, hereinafter referred to as UID) 14t indicating a personal page (or personal blog, etc.) in which advertisement information is posted based on a contract with an advertisement providing site administrator (advertisement provider), the management ID allows for identifying advertisement information posted on the personal page (or personal blog, etc.).

If one advertiser posts one item of advertisement information including one item of identification information on one advertisement providing site, one item of identification information and one management ID are associated with the advertisement information. In this case, accounts can be managed with the identification information, making the management ID unnecessary. However, for example, if a single item of information including one item of identification information is posted on a plurality of advertisement providing sites, or if one advertiser posts a plurality of items of advertisement information including the same item of identification information on one advertisement providing site, or if different items of identification information are dynamically allocated to one item of advertisement information from day to day, etc., it is difficult to manage accounts with only the identification information and it is desirable to manage accounts using the management ID.

In addition, in the present Embodiment 1, for ease of description, a case is described in which one item of identification information 11a corresponds to one item of advertisement information 10 to post on one advertisement providing site 12a. Specifically, the identification information 11a corresponds to the management ID 14 in a one-to-one relationship, and the identification information 11a therefore indicates the MID 14p, the DID 14q, the PID 14r, the SID 14s, and the UID 14t, allowing an advertiser, an advertising agent, an item of merchandise, an advertisement providing site, and a personal page to be specified by the identification information 11a.

Herein, at least one of the MID 14p, the DID 14q, the PID 14r, the SID 14s, or the UID 14t (in the present Embodiment 1, all of them) indicated by this identification information 11a is sent from the call receiving server 2 to the advertiser's server 3 as call related information 19, and the details are described below.

<Call Connecting Process>

When the user U makes a call from the user's phone 8 based on the identification information 11a, the call is received by the call receiving server 2. The call receiving server 2 is a server computer for receiving a call from the user's phone 8 of the user U and is connected to the Internet W and the telephone network N. The user's phone 8 and the advertiser's phone 7 of the advertiser A1 are also connected to this telephone network N, allowing the user U to make a call to the advertiser A1 via the call receiving server 2. The call receiving server 2 may be connected not to the Internet W but directly to the advertisement server 1 as shown in FIG. 1.

Figure 4:
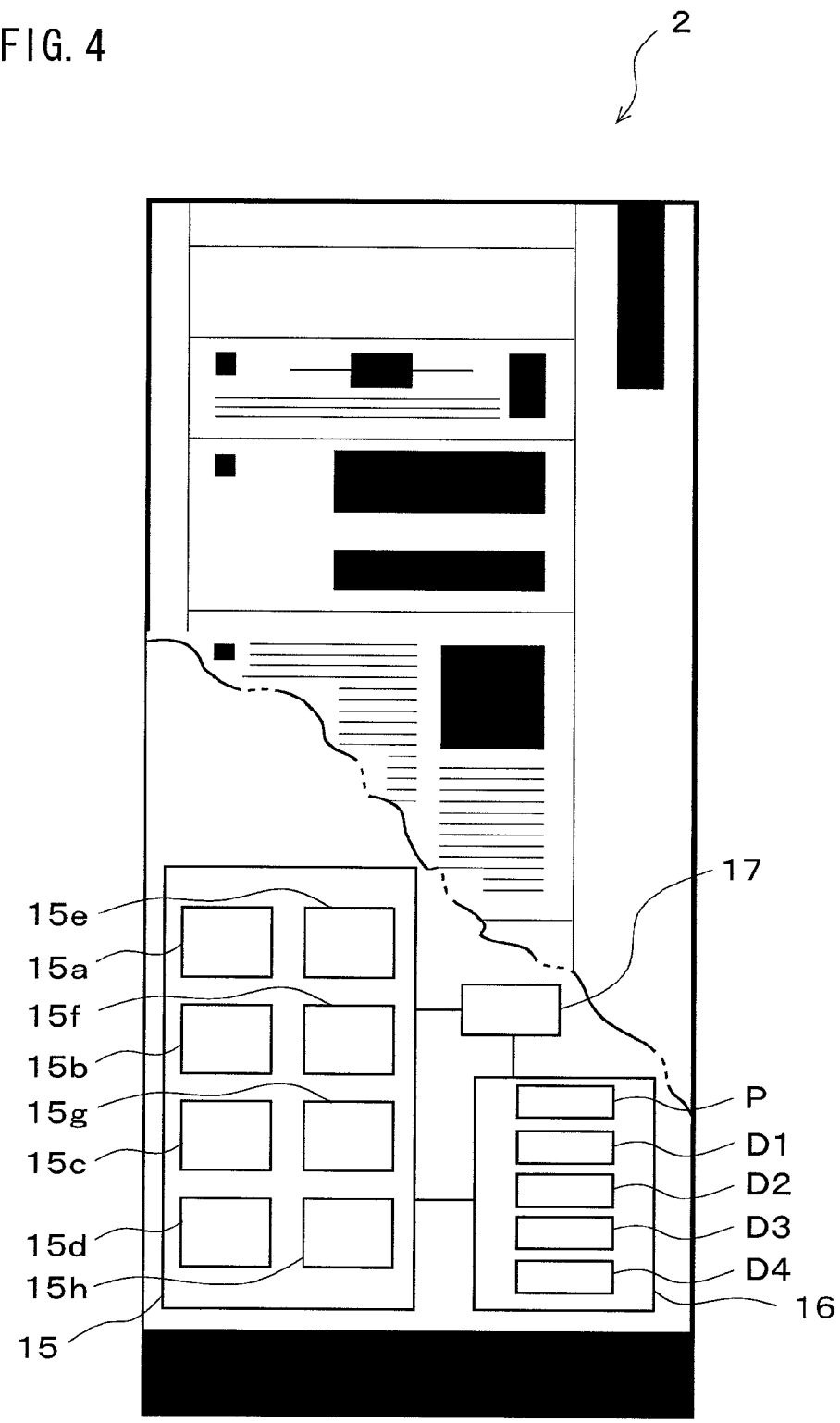
FIG. 4 is a block diagram showing the internal configuration of the call receiving server shown in FIG. 1.

The call receiving server 2 has an internal central processing unit (CPU; the principal part of a computer) 15, a storage device 16, and a memory 17 as shown in FIG. 4. A call receiving program P, a discrimination-information database D1, a dictionary database D2, and a user-information database D3 are stored in the storage device 16. In addition, the call receiving program P causes the CPU 15 to function as an identification information acquisition part 15a, a discrimination information generation part 15b, an information associating part 15c, a call connection part 15d, a discrimination information sending part 15e, a voice generation part 15f, a discrimination information receiving part 15g, and a call related information sending part 15h.

Figure 5:
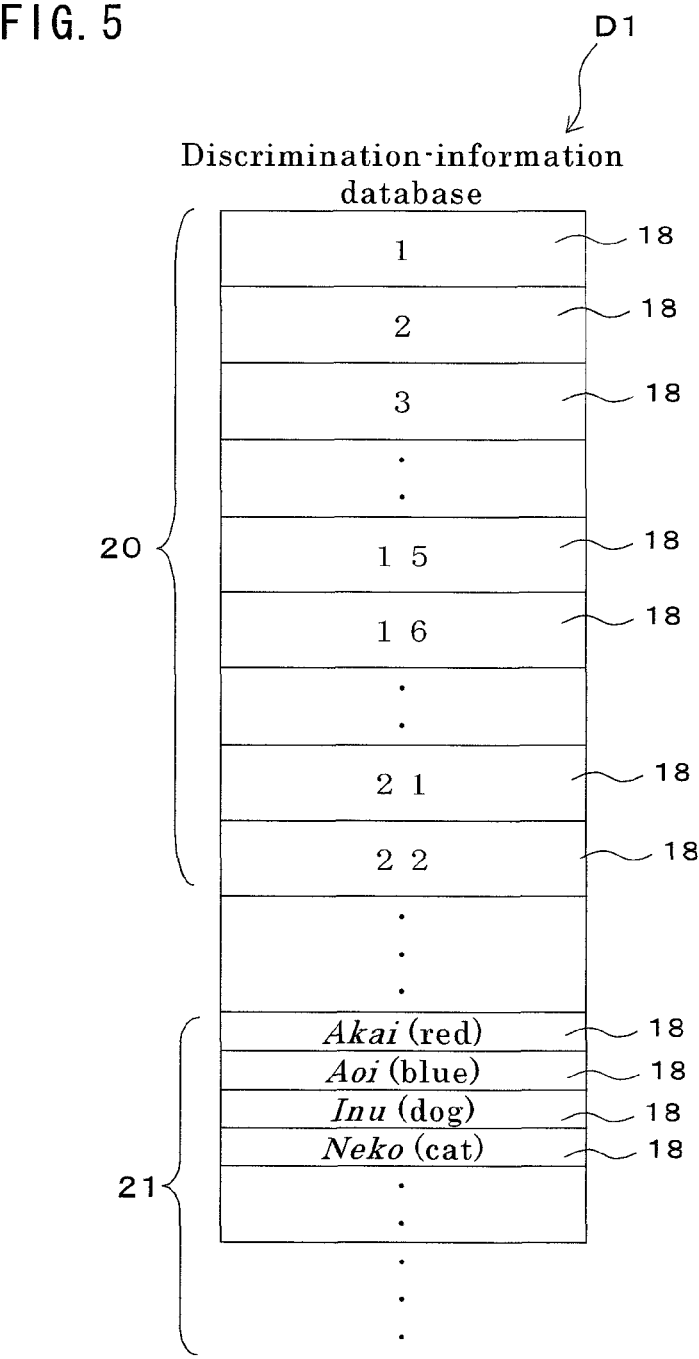
FIG. 5 is a data structure diagram of a discrimination-information database built in the call receiving server shown in FIG. 1.

The discrimination-information database D1 is configured with a plurality of items of discrimination information 18 as shown in FIG. 5. This discrimination information 18 is information used to discriminate a call from the user U contacting the advertisement information 10 from other calls, and it is associated with the identification information 11a acquired by the identification information acquisition part 15a. The discrimination information 18 is configured with numeric information 20 with two digits or less (e.g., "1", "2", "3", "15", "21", etc.) and word information 21 with three hiragana characters or less (e.g., "aoi (blue)", "akai (red)", "inu (dog)", "neko (cat)", etc.), each being simple and including a small amount of information. The word information 21 is extracted from the dictionary database D2 and stored in the discrimination-information database D1 by the CPU 15, which functions as a word-extracting part (not shown). In addition, the discrimination-information database D1 includes flag information that indicates whether the discrimination information 18 is used, that is, whether it is associated with the identification information 11, and the flag information may be associated with every item of discrimination information 18.

The dictionary database D2 is configured with a plurality of items of word information 21 as shown in FIG. 6. This dictionary database D2 is configured exclusively with many items of word information 21 with simple configurations of three hiragana characters or less, such as the abovementioned "aoi (blue)", "akai (red)", "inu (dog)", "neko (cat)", etc. Therefore, as described below, even when a voice playback of this word information 21 is generated with the voice generation part 15f, hearing errors by the phone responder are rare. All or any of the items of word information 21 in this dictionary database D2 are extracted as discrimination information 18 by the word-extracting part and are stored in the discrimination-information database D1.

Figure 7:
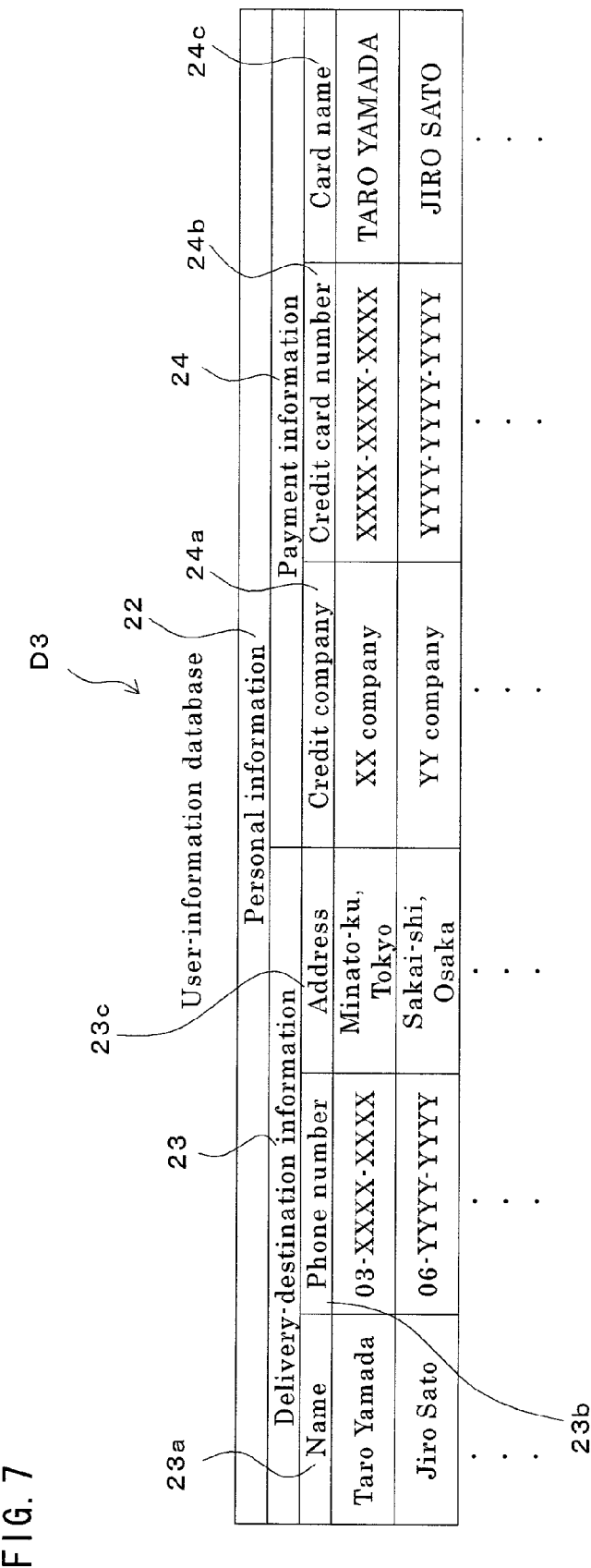
FIG. 7 is a data structure diagram of a user-information database built in the call receiving server shown in FIG. 1.

The user-information database D3 is configured with personal information 22 for each of a plurality of users U as shown in FIG. 7. The personal information 22 includes, for example, delivery-destination information 23 and payment information 24, and these delivery-destination information 23 and payment information 24 are each configured by being associated with every user U.

The delivery-destination information 23 includes, for example, name information 23a, phone number information 23b, and address information 23c for each user U. For example, this delivery-destination information 23 is registered by the user U in advance via the advertisement server 1, the advertiser's server 3, the advertisement providing server 5a, or the agent server 4, and the registered items of information are stored in the user-information database D3 of the call receiving server 2. Alternatively, it is directly registered in the call receiving server 2 in advance by the user U, and the registered items of information are stored in the user-information database D3.

The payment information 24 includes, for example, credit-card-company information 24a, credit-card-number information 24b, and credit-card-name information 24c for each user U. For example, similar to the delivery-destination information 23, this payment information 24 is registered in advance via the advertisement server 1, the advertiser's server 3, the advertisement providing server 5a, or the agent server 4 by the user U, and the registered items of information are stored in the user-information database D3 of the call receiving server 2. Alternatively, it is directly registered in the call receiving server 2 in advance by the user U, and the registered items of information are stored in the user-information database D3.

However, each of the abovementioned databases D1 to D3 may be stored in the call receiving server 2 as described in Embodiment 1, or, of course, they may be partially or completely stored in the advertisement server 1. In other words, it is only necessary to enable the sending and receiving of information between each of the databases D1 to D3 and the call receiving server 2, and there are no limits to the storage location. In addition, if the numeric information 20 is used as the discrimination information 18 without using word information 21, or if a predetermined number of types of word information 21 are stored in the discrimination-information database D1 and only the items of word information 21 are used, the dictionary database D2 and the word-extracting part may be eliminated.

The functions exerted by the CPU 15 are described below. The identification information acquisition part 15*a* has a function to receive a call made based on the identification information 11*a* from the user U to acquire the identification information 11*a*. Specifically, when the user U who has viewed the identification information 11*a* provided on the advertisement providing page inputs the identification information 11*a* ("0125423-0011002553") from the user's phone 8 while making a call, the call is connected to the call receiving server 2 based on the first 7-digit server identification number ("0125423").

The identification-information acquisition part 15*a* has a function to recognize the call through the signal network without receiving the phone call pass and acquire the input identification information 11*a* ("0125423-0011002553"). Then, the identification-information acquisition part 15*a* sends the acquired identification information 11*a* to the information-associating part 15*c*. Because the identification-information acquisition part 15*a* does not receive the call, the user U may make the phone call smoothly as if they had directly called the call receiver without becoming aware of the relay of the call receiving server 2. In addition, as a call charge related to the call reception is not generated at this point, if, for example, the call receiver is busy, absent, etc., no call charge is imposed on the user U, allowing the user U to reduce the generation of unnecessary costs.

Based on the identification information 11*a*, the identification information acquisition part 15*a* acquires an advertiser phone number B1 and the management ID 14*a* associated with the identification information 11*a* from the information management database D of the advertisement server 1. It then sends that information to the information associating part 15*c*. The advertiser phone number B1 is also sent to the call connection part 15*d*.

In addition, the identification information acquisition part 15*a* has a function to also acquire the caller's number (specifically, the phone number information 23*b* of the user U) if the call uses a caller-number notification function. Based on the acquired phone number information 23*b* of the user U, the identification information acquisition part 15*a* acquires the personal information 22 of the user U (the delivery-destination information 23 and the payment information 24) from the user-information database D3. Then, the identification information acquisition part 15*a* sends the personal information 22 (including the phone number information 23*b*) to the information associating part 15*c* as a part of the call related information 19.

Meanwhile, a configuration involving a voice input (vocalization) of the personal information 22 of the user U (the delivery-destination information 23 and the payment information 24) during the call may be used. In that case, the identification information acquisition part 15*a* can directly acquire the personal information 22 from the user (caller) U without using the user-information database D3 and can send the information to the information associating part 15*c* as a part of the call related information 19.

The identification information acquisition part 15*a* may convert the voice input of the personal information 22 from the user U into voice data and send it to the information associating part 15*c*. If the identification information acquisition part 15*a* has a voice recognition function, it may convert the content of the voice input of the personal information 22 into character data and send it to the information associating part 15*c*. In such a case, of course, the user-information database D3 may be eliminated and the personal information 22 of the user U can be acquired without using the caller-number notification function.

The discrimination information generation part 15*b* has a function to generate the discrimination information 18 each time a call is received. Specifically, when the call made by the user U is received by the identification information acquisition part 15*a*, a reception signal indicating reception of the call is sent to the discrimination information generation part 15*b* and the discrimination information generation part 15*b* generates the discrimination information 18 each time the reception signal is received.

The discrimination information generation part 15*b* may be configured to generate serial or random numeric information 20 with two digits or less, such as "1", "2", "3", etc., as the discrimination information 18, or it may be configured to generate discrimination information 18 by serially or randomly extracting word information 21 with three characters or less (e.g., "aoi (blue)", "akai (red)", etc.) from the dictionary database D2.

The discrimination information generation part 15*b* may be configured to store the generated discrimination information 18 in the discrimination-information database D1 temporarily, or configured to send it to the information associating part 15*c*. Therefore, if the function of this discrimination information generation part 15*b* is used, it is not necessary to prepare the discrimination information 18 in advance.

If the generated discrimination information 18 is stored in the discrimination-information database D1 temporarily, it is not necessary to prepare the discrimination information 18 in the discrimination-information database D1 in advance. In addition, if it is configured to send the generated discrimination information 18 to the information associating part 15*c* and the discrimination information sending part 15*e*, the discrimination-information database D1 itself may be eliminated. However, in the description of this Embodiment 1, the function of this discrimination information generation part 15*b* shall not be used, and instead, the information associating part 15*c* and the discrimination information sending part 15*e* shall extract the discrimination information 18 from the discrimination-information database D1.

The information associating part 15*c* has a function to associate the identification information 11*a* with the discrimination information 18. Specifically, it receives the identification information 11*a* sent from the identification information acquisition part 15*a*, extracts one item of the discrimination information 18 from the discrimination-information database D1 (or receives the discrimination information 18 sent from the discrimination information generation part 15*b*), mutually associates them, and creates a database of related information D4 as shown in FIG. 8.

Herein, the information associating part 15*c* associates the call related information 19 along with the identification information 11*a* with the discrimination information 18 and creates the database of related information D4. The call related information 19 is information that is indicated by the identification information 11*a*, and as described above, includes the personal information 22 of the user U acquired by the identification information acquisition part 15*a* as well as the management ID 14 (MID 14*p*, DID 14*q*, PID 14*r*, SID 14*s*, UID 14*t*) from the information management database D.

If the personal information 22 of the user U is a voice input entered through the call made by the user U, the data file in which the voice input of the personal information 22 is converted into voice data or character data will be associated with the discrimination information 18 as a part of the call related information 19.

The call connection part 15*d* has a function to connect a call to a call receiver. Specifically, based on the identification information 11*a*, the call connection part 15*d* connects a call from the user U to the advertiser's phone 7 using the advertiser phone number B1 of the advertiser A1 as the call receiver indicated by the identification information 11*a*. In practice, the advertiser phone number B1 is received from the identification information acquisition part 15*a*, and the advertiser's phone 7 is therefore called based on the advertiser phone number B1 and the advertiser A1 answers the phone, and after the completion of sending the discrimination information 18 using the discrimination information sending part 15*e*, the call is connected in a manner that allows the user U and the advertiser A1 to engage in a phone call.

The discrimination information sending part 15*e* has a function to send the discrimination information 18 to the advertiser A1 through a call connected to the advertiser's phone 7. Specifically, based on the database of related information D4, the discrimination information sending part 15*e* sends the discrimination information 18 associated with the identification information 11*a* acquired by the identification information acquisition part 15*a* to the advertiser A1 through a call.

In doing so, the discrimination information sending part 15*e* sends the discrimination information 18 that has been converted into voice data by the voice generation part 15*f* through a call. The voice generation part 15*f* has a voice conversion function that allows voice data to be generated based on the discrimination information 18. Specifically, if the discrimination information 18 has "1" as the numeric information 20, voice data stating, "The number of the discrimination information is 1," can be generated, and if the discrimination information 18 has "2" as the numeric information 20, voice data stating, "The number of the discrimination information is 2," can be generated. In addition, if the discrimination information 18 has "akai (red)" as the word information 21, voice data stating, "The discrimination information is ' akai (red)'," can be generated.

As described above, the voice data generated by the voice generation part 15*f* is announced as a voice announcement by the discrimination information sending part 15*e* to the advertiser's phone 7. Accordingly, the advertiser A1 can hear a voice announcement stating, for example, "The discrimination information is XX" from the speaker of the advertiser's phone 7. However, it is desirable that the voice announcement of the discrimination information 18 is carried out prior to the phone call between the user U and the advertiser A1. Therefore, the present Embodiment 1 is configured so that when the call connection part 15*d* calls the advertiser's phone 7 and the advertiser A1 answers the call, first, a voice announcement of the discrimination information 18 is sent from the receiver before the call with the user U can be made.

<Process of Sending Call Related Information>

When the advertiser A1 hears the announcement stating, "The discrimination information is XX," and then activates the advertiser's server 3, connects to the call receiving server 2 via the Internet W, and inputs the discrimination information 18 in a web browser, the input discrimination information 18 is sent to the call receiving server 2.

In the call receiving server 2, the discrimination information receiving part 15*g* receives the discrimination information 18 sent from the advertiser's server 3. Then, the discrimination information receiving part 15*g* sends the received discrimination information 18 to the call related information sending part 15*h*.

The call related information sending part 15*h* has a function whereby, when it receives the discrimination information 18 from the discrimination information receiving part 15*g*, it sends the call related information 19 indicated by the identification information 11*a* associated with the discrimination information 18 to the advertiser's server 3. Specifically, the call related information sending part 15*h* specifies the identification information 11*a* associated with the received discrimination information 18 by referring to the database of related information D4 and acquires the call related information 19 indicated by the identification information 11*a*. Then, it sends the call related information 19 via the Internet W to the advertiser's server 3 that is the sender of the discrimination information 18. Accordingly, the call related information 19 is displayed on the web browser of the advertiser's server 3 so as to correspond to the input discrimination information 18.

As described above, the advertiser A1 can hear a voice announcement for transmitting the discrimination information 18 after answering the call upon receiving the call based on the identification information 11*a* from the user U. Because the discrimination information 18 is simple information such as "1" and "2", there is a smaller risk of mishearing the information.

In addition, when the discrimination information 18 is input to the advertiser's server 3 while making a phone call with the user U, the items of call related information 19 (e.g., merchandise ID 14*r*, advertisement providing site ID 14*s*, delivery-destination information 23, payment information 24, etc.) corresponding to the discrimination information 18 are displayed on the advertiser's server 3, allowing for easily ascertaining which user with which address called while viewing which advertisement information related to which merchandise posted on which advertisement providing site without taking the time to confirm such information with the user U again.

Figure 9:
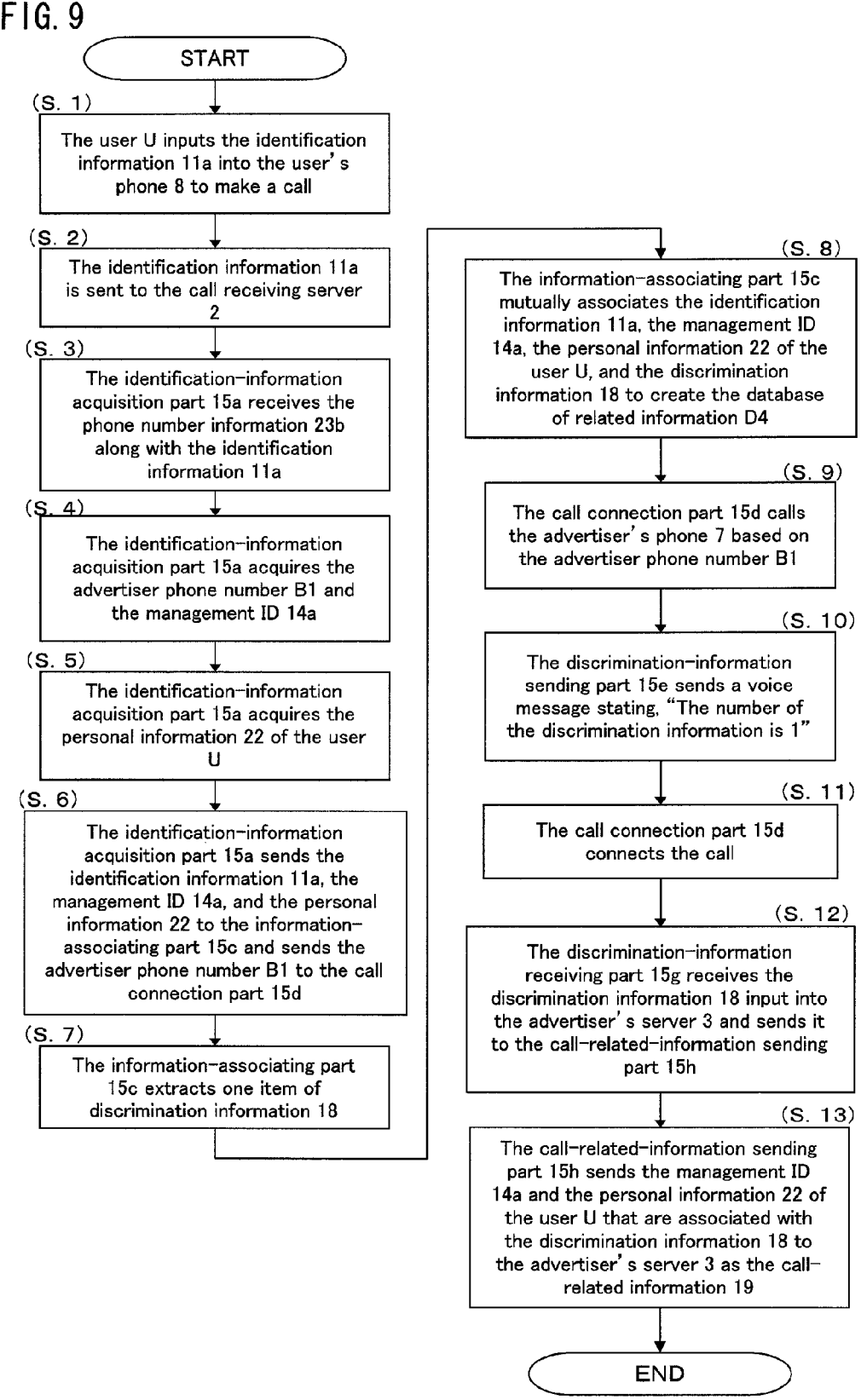
FIG. 9 is a flowchart describing a procedure for receiving a call with the call receiving server according to Embodiment 1 of the present invention.

A procedure for receiving a call with this call receiving server 2 is described below with reference to the flowchart in FIG. 9.

The user U who has viewed the advertisement information 10*a* and the identification information 11*a* posted on the advertisement providing page 12*b* inputs the identification information 11*a* ("0125423-0011002553") into the user's phone 8 to make a call (S. 1). Accordingly, the call is connected to the call receiving server 2 based on the first 7-digit server identification number "0125423" of the identification information 11*a*, and the identification information 11*a* is sent to the call receiving server 2 (S. 2).

The identification information acquisition part 15*a* of the call receiving server 2 receives the phone number information 23*b* of the user U along with the identification information 11*a* (S. 3). Based on the identification information 11*a*, the identification information acquisition part 15*a* acquires the management ID 14*a* including the advertiser phone number B1, MID 14*p*, DID 14*q*, PID 14*r*, SID 14*s*, and UID 14*t* from the information management database D of the advertisement server 1 (S. 4). Based on the phone number information 23*b* of the user U, the identification information acquisition part 15*a* acquires the personal information 22 of the user U from the user-information database D3 (S. 5). The identification information acquisition part 15*a* sends the identification information 11*a*, the management ID 14*a*, and the personal information 22 of the user U to the information associating part 15c and sends the advertiser phone number B1 to the call connection part 15d (S. 6).

The information associating part 15c extracts one item of the discrimination information 18 ("1") from the discrimination-information database D1 (S. 7). Then, the identification information 11a, the management ID 14a, the personal information 22 of the user U, and the discrimination information 18 ("1") received from the identification information acquisition part 15a are mutually associated to create the database of related information D4 (S. 8).

The call connection part 15d calls the advertiser's phone 7 based on the advertiser phone number B1 received from the identification information acquisition part 15a (S. 9). When the advertiser A1 answers the call, the discrimination information sending part 15e sends a voice message stating, "The number of the discrimination information is 1" (S. 10), and then, the call connection part 15d connects the call, enabling the user U and the advertiser A1 to engage in a phone call (S. 11).

When the advertiser A1 who has heard the voice message stating, "The number of the discrimination information is 1," inputs the discrimination information 18 of "1" in the web browser of the advertiser's server 3, the discrimination information 18 ("1") is received by the discrimination information receiving part 15g via the Internet W, and the discrimination information receiving part 15g sends the discrimination information 18 to the call related information sending part 15h (S. 12). Based on the discrimination information 18 ("1"), the call related information sending part 15h refers to the database of related information D4 and sends the management ID 14a associated with the discrimination information 18 ("1") and the personal information 22 of the user U to the advertiser's server 3 as the call related information 19 (S. 13). Accordingly, information indicating which advertisement information related to which merchandise posted on which advertisement providing site the call from the user U has been made based on is displayed on the advertiser's server 3 along with the delivery destination and credit information, etc. of the user U.

However, in the present Embodiment 1, the description is of a case in which the call receiving server 2 functions as the identification information acquisition part 15a, the discrimination information generation part 15b, the information associating part 15c, the call connection part 15d, the discrimination information sending part 15e, the voice generation part 15f, the discrimination information receiving part 15g, and the call related information sending part 15h, but of course, a part of these functions may be shared with and performed by another server computer, such as the advertisement server 1, to exert the functions of a call receiving device through overall cooperation.

In addition, one item of the discrimination information 18 ("1") is extracted from the discrimination-information database D1 and the discrimination information 18 ("1") is associated with the identification information 11a, etc. to create the database of related information D4, but a configuration may be used in which the database of related information D4 is deleted after the call related information 19 is sent by the call related information sending part 15h or the phone call made between the user U and the advertiser A1 is terminated.

When the database of related information D4 is created by associating the discrimination information 18 ("1") with the identification information 11a, flag information of the discrimination information 18 ("1") in the discrimination-information database D1 becomes information indicating that the discrimination information 18 is "in use", but the flag information of the discrimination information 18 ("1") in the discrimination-information database D1 returns to being information indicating that the discrimination information 18 is "not in use" when the database of related information D4 is deleted. Therefore, when the next call is received, this discrimination information 18 ("1") can be dynamically reused.

In the present Embodiment 1, the description is of a configuration in which the information associating part 15c extracts one item of the discrimination information 18 from the discrimination-information database D1 upon receiving a call, but of course, it may be a configuration in which the discrimination information generation part 15b generates the discrimination information 18 upon receiving a call as described above.

Embodiment 2

In Embodiment 2 of the present invention, the call receiving server 2 is configured to have a function to connect a call from the user U to either the advertiser A1 or a call center C depending on the time.

Figure 10:
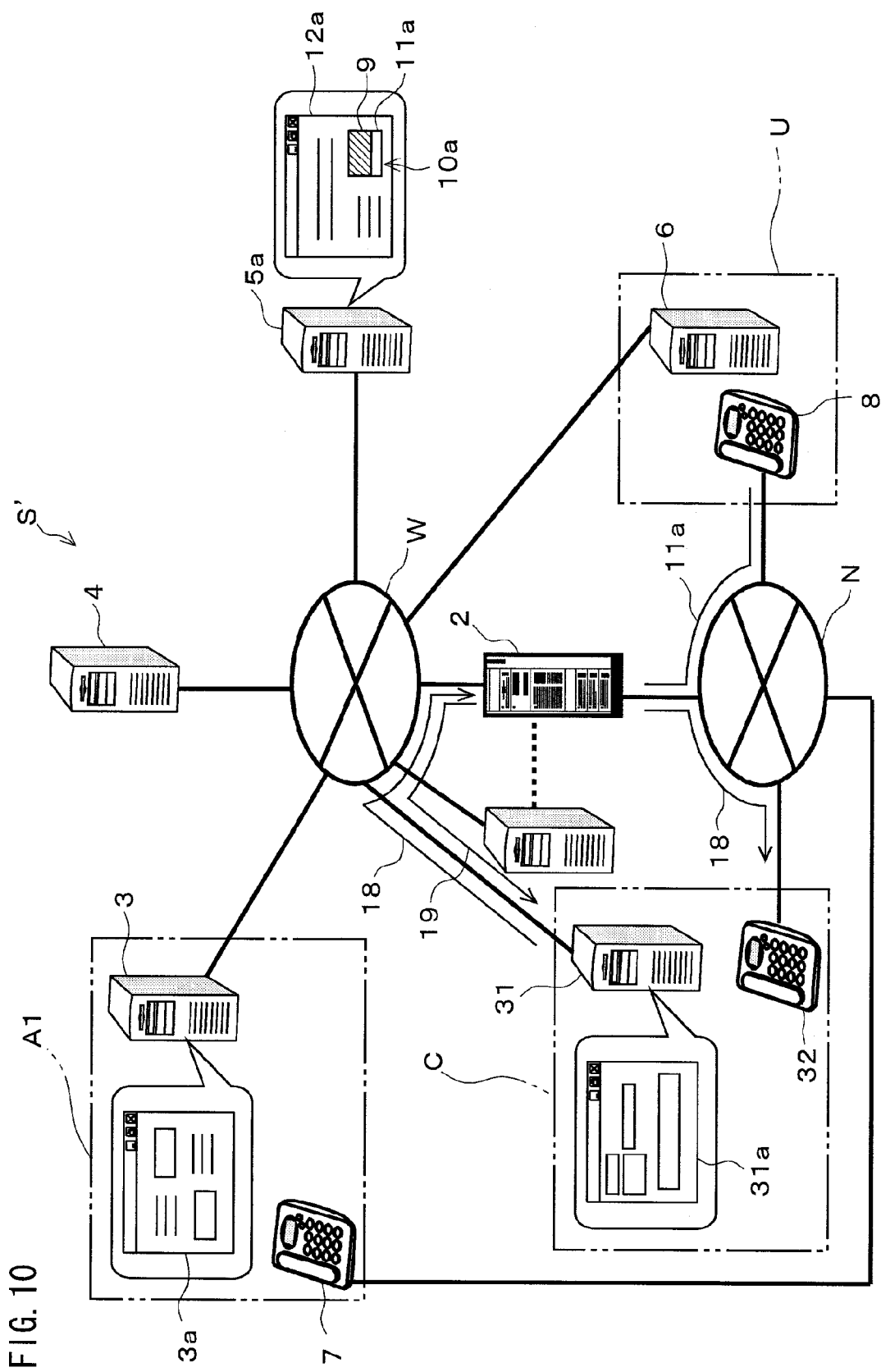
FIG. 10 is a schematic block diagram showing the overall configuration of an advertisement system composed of a call receiving server according to Embodiment 2 of the present invention.

FIG. 10 is a schematic block diagram showing the overall configuration of an advertisement system S' composed of the call receiving server 2 according to Embodiment 2 of the present invention. This call receiving server 2 has an internal clock function and a call-receiver switching part (both not shown). In addition, this system is configured to switch the connection destination of a call based on the identification information 11a from the user U depending on the time. Furthermore, in the present Embodiment 2, configurations similar to those in Embodiment 1 are provided with the same symbols and the descriptions thereof are omitted.

The call-receiver switching part has a function that is one of the functions exerted by the CPU 15 of the call receiving server 2 and switches the connection destination of a received call depending on the time. For example, calls made from 10:00 a.m. to 18:00 p.m. to the call receiving server 2 are connected to each advertiser A indicated by the identification information 11, and all calls made from 18:00 p.m. to 10:00 a.m. are connected to the call center C as the call receiver regardless of the identification information 11.

The call center C is a centralized reception center for answering all calls made based on the identification information 11 when the advertiser A is within non-business hours during the evening and cannot answer calls. The call center C has a call center server 31 and a call center phone 32 as fixed devices, and calls connected to the call center C reach the call center phone 32. For example, the call center C has a plurality of phone lines and a plurality of call center phones 32. There is a plurality of call center phone numbers corresponding to the plurality of phone lines, and all of the call center phone numbers are stored in the storage device 16. The calls are sequentially allocated to different call center phone numbers in the order of reception and the calls are connected to any of the call center phones 32 of the call center C.

Specifically, upon receiving a call from the user U based on the identification information 11a through the identification information acquisition part 15a, if the time of reception is between 18:00 p.m. and 10:00 a.m., the identification information acquisition part 15a sends one of the plurality of call center phone numbers preliminarily stored in the storage device 16 to the call connection part 15d. Then, the call connection part 15d calls the call center phone 32 based on the received call center phone number. Other operations, for example, for creating the database of related information D4 and sending the discrimination information 18 are similar to those in Embodiment 1.

FIG. 11 is an example of a web browser 31a displayed in the display screen of the call center server 31. In the call center C, when the responder who hears the discrimination information 18 in response to the call inputs the discrimination information 18 into the discrimination-information field 31b of the web browser 31a, the identification information 11 and the call related information 19 corresponding to the discrimination information 18 are displayed on the identification-information field 31c and the call related information field 31d, respectively.

The call center intensively receives calls based on various types of advertisement information 10 related to various types of advertisers A. Therefore, the phone responder is required to handle a plurality of items of complicated information quickly and to ascertain the call related information 19 related to the call, and according to the embodiment of the present invention, the call related information 19 can be ascertained simply by ascertaining simple discrimination information 18 and inputting it into the web browser 31a. There is no need to acquire the delivery destination and payment information of the user U, allowing for reductions in the amount of time that one call occupies a phone line, thus contributing to reduced call traffic.

Embodiment 3

In Embodiment 3 of the present invention, the description is one of a configuration in which the identification information 11a is not explicitly posted in the advertisement providing page 12b but the identification information 11a is implicitly provided; that is, another landing page on which the identification information 11a is posted is displayed. Furthermore, in the present Embodiment 3, configurations similar to those in Embodiment 1 are provided with the same symbols and the descriptions thereof are omitted.

Figure 12:
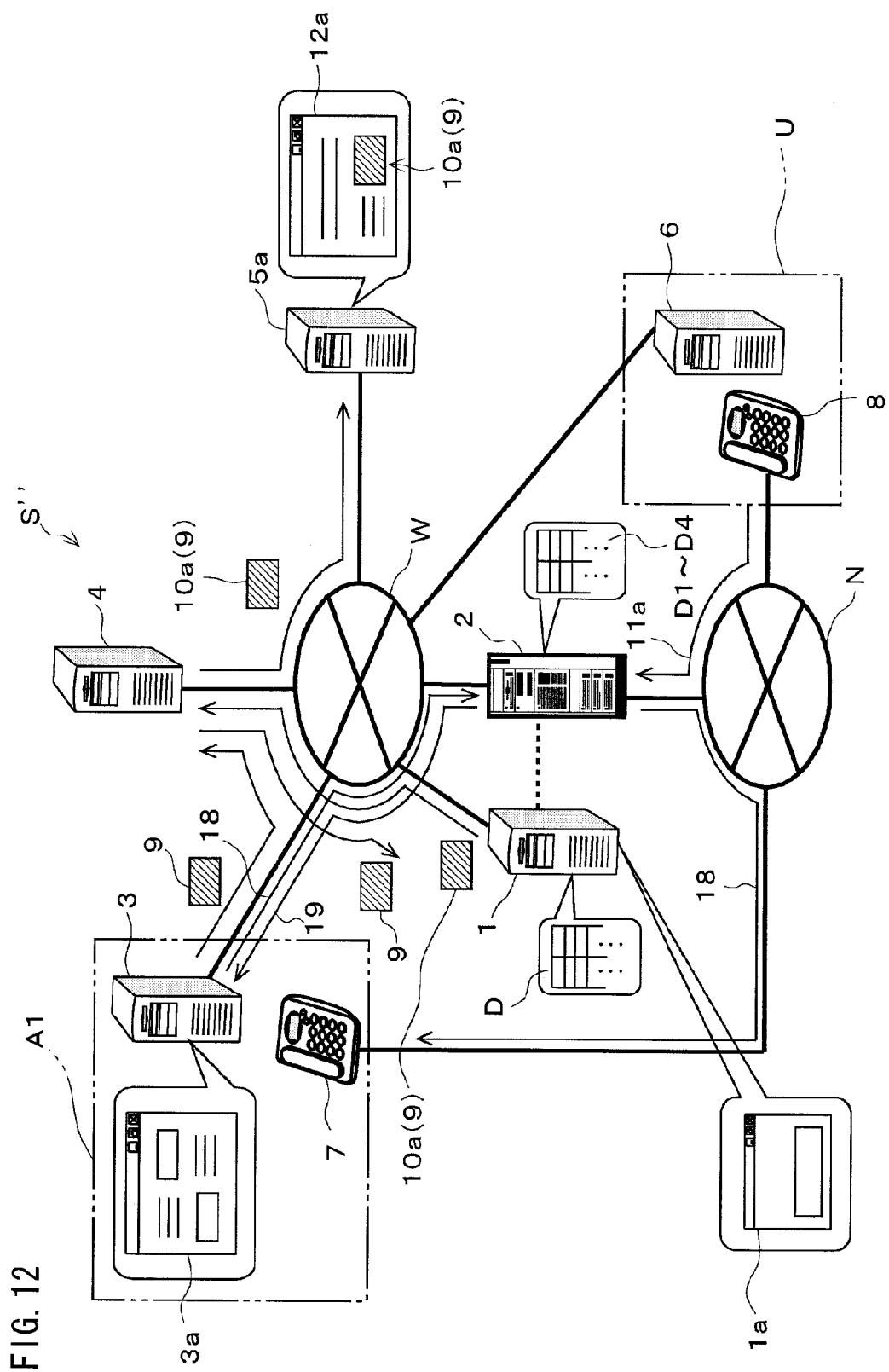
FIG. 12 is a schematic block diagram showing the overall configuration of an advertisement system composed of a call receiving server according to Embodiment 3 of the present invention.

FIG. 12 is a schematic block diagram showing the overall configuration of an advertisement system S" composed of the call receiving server 2 according to Embodiment 3 of the present invention. In this Embodiment 3, when the agent server 4 receives the banner image 9 from the advertiser's server 3, it sends the banner image 9 to the advertisement server 1. The advertisement server 1 associates the received banner image 9 with the identification information 11a and the management ID 14a and links the banner image 9 with the landing page 1a built in the advertisement server 1. The landing page 1a is a web page, and the identification information 11a is posted in the page.

When the advertisement server 1 returns the banner image 9 to the agent server 4, the agent server 4 send the banner image 9 to the advertisement providing server 5a as the advertisement information 10a. The link-processed banner image 9 is posted on the advertisement providing page 12b of the advertisement providing server 5a as the advertisement information 10a.

When the user U browses the advertisement providing page 12b using the user's computer 6 and clicks the advertisement information 10a, the landing page 1a is displayed as a link destination on the user's computer 6. The identification information 11a is posted on the landing page 1a, allowing the user U to make a call to the advertiser A1 from the user's phone 8 based on the identification information 11a.

However, the identification information 11a posted on the landing page 1a may be changed depending on the time of access to the landing page 1a. Specifically, if the time when the landing page 1a is displayed on the user's computer 6 through the link from the advertisement information 10a is between 10:00 a.m. and 6:00 p.m., it may be the identification information 11a indicating the advertiser A1, or if the time is between 6:00 p.m. and 10:00 a.m., it may be information that is different from the identification information 11a (e.g., the phone number of the call center C).

According to the embodiments of the present invention, even if the call related information indicated by the identification information is complex and includes a large amount of information, the call related information can be simply and reliably transmitted to a caller with a smaller amount of information by transmitting discrimination information that is simple and has a relatively small amount of information to the caller in place of the call related information. The call related information indicated by the identification information associated with the discrimination information can be ascertained by the call receiver simply by inputting the discrimination information received through the call into a predetermined device, allowing for reduced labor and complexity for ascertaining information and the prevention of transmission errors to reliably ascertain information.

An embodiment of the present invention may also have a discrimination-information generation part that generates discrimination information each time a call is received.

If an embodiment of the present invention has the discrimination information generation part, it is not necessary to preliminarily prepare a plurality of items of discrimination information to enable responses to a plurality of calls. The discrimination information may be generated by the discrimination information generation part each time a call is received, thus allowing for the generation of a plurality of items of discrimination information corresponding to each call, even if, for example, the number of calls connected to a call receiver during a single period of time increases unexpectedly.

The predetermined device may be a computer and the discrimination information receiving part may receive the discrimination information input using through the Internet using the computer, wherein the call related information sending part may send the call related information associated with the discrimination information through the Internet to the computer.

The call receiver's computer and this call receiving device are connected via the Internet, allowing for information to be easily sent and received between the call receiver's computer and the call receiving device and easily realizing the sending of information using the discrimination information. For example, a configuration may used in which, when the discrimination information is input in a web browser using the call receiver's computer, call related information indicated by identification information associated with the discrimination information is displayed on the web browser. Therefore, the call receiver can ascertain the call related information with a simple manipulation using the discrimination information received through a call.

The call related information may include at least one of either client information for identifying the web page or merchandise information for identifying merchandise that is provided by the call receiver in relation to the identification information.

The call related information includes provider information, client information, merchandise information, and other information, allowing for simply and reliably transmitting such information to a call receiver using discrimination information. Therefore, even if the call related information includes complicated and widely varying items of information, the occurrence of transmission errors and troublesome labor can be prevented, and the call related information can be transmitted reliably with a small amount of information.

The discrimination information may be at least one of either numeric information with a predetermined number of digits or less, character information with a predetermined number of characters or less, or a combination of numeric information and character information.

The discrimination information is of a small amount and has a simple configuration, is this facilitates management and handling for both associating it with the call related information and sending the discrimination information through a call. In addition, this also facilitates inputting the discrimination information received by the call receiver into a predetermined device, thus allowing for decreased errors in information transmission and reduced workloads for ascertaining information.

The discrimination information sending part may send discrimination information to a call receiver by voice.

The discrimination information is sent to a call receiver through a call by voice, allowing the phone responder receiving the call in a call receiver to easily ascertain the discrimination information by listening to it with their ear. For example, in a case in which the discrimination information is "1", the call receiving device sends an announcement stating, "The number is 1", allowing the phone responder to easily ascertain that the discrimination information is "1" and to reliably transmit the information.

A call receiving method related to an embodiment of the present invention includes the steps of: receiving a call made based on identification information that is explicitly or implicitly provided in a web page and identifies a call receiver, acquiring the identification information, associating the acquired identification information with discrimination information for discriminating each of a plurality of the calls, connecting the call to the call receiver, sending the discrimination information through the connected call to the call receiver, receiving the discrimination information input into a predetermined device; and sending call related information indicated by the identification information associated with the discrimination information to the predetermined device.

According to the embodiment of the present invention, even if the call related information indicated by the identification information is complex and includes a large amount of information, the call related information can be simply and reliably transmitted to a caller using a smaller amount of information by transmitting discrimination information that is simple and has a relatively small amount of information to the caller in place of the call related information. The call related information indicated by the identification information associated with the discrimination information can be ascertained by the call receiver simply by inputting the discrimination information received through the call into a predetermined device, allowing for reduced labor and complexity for ascertaining information and preventing transmission errors to reliably ascertain information.

A call receiving program related to another embodiment of the present invention causes a computer to function as: an identification information acquisition part that receives a call made based on identification information that is explicitly or implicitly provided in a web page and identifies a call receiver to acquire the identification information, an information associating part that associates the acquired identification information with discrimination information for discriminating each of a plurality of the calls, a call connection part to connect the call to the call receiver, a discrimination information sending part that sends the discrimination information through the connected call to the call receiver, a discrimination information receiving part that receives the discrimination information input into a predetermined device; and a call related information-sending part that sends call related information indicated by the identification information associated with the discrimination information to the predetermined device.

According to the embodiment of the present invention, for example, even if the call related information indicated by the identification information is complex and includes a large amount of information, the call related information can be simply and reliably transmitted to a caller using a smaller amount of information by transmitting discrimination information that is simple and has a relatively small amount of information to the caller in place of the call related information. The call related information indicated by the identification information associated with the discrimination information can be ascertained by the call receiver simply by inputting the discrimination information received through the call into a predetermined device, allowing for reduced labor and complexity for ascertaining information and preventing transmission errors to reliably ascertain information.

According to the embodiments of the present invention, various types of information (call related information) to be transmitted from a caller to a call receiver during a call can be simply and reliably transmitted to a call receiver by using discrimination information. Even if the information to be transmitted is complicated and is of a large amount, the information can be reliably transmitted by using discrimination information that is simple and includes a small amount of information in its place, allowing the call receiver to easily ascertain the discrimination information and reducing troublesome labor and transmission errors.

Preferred embodiments of the present invention have been described above, but the present invention is not limited to these and it is possible to make various modifications and changes within the scope of the invention.

What is claimed is:

1. A call receiving device comprising:
    a server configured to acquire identification information, which is configured with a server identification number and an advertisement identification number, by receiving calls each made based on the identification information that is explicitly or implicitly provided in a web page and that identifies a call receiver;
    an information associating part configured to associate the acquired identification information with discrimination information which is configured with numeric information with two digits or less and word information with three characters or less, each being simple and including a small amount of information to discriminate each of the calls;
    a call connection part configured to connect each of the calls to the call receiver;
    a discrimination information sending part configured to send the discrimination information to the call receiver through the call connected to the call receiver;
    a discrimination information receiving part configured to receive the discrimination information input into a predetermined device; and
    a call related information sending part configured to send, to the predetermined device, call related information indicated by the identification information associated with the discrimination information,
    wherein the server has a function to be connected to the call based on the server identification number to acquire an input identification information without receiving a phone call pass, to acquire an advertiser phone number based on the input identification information, and to call an advertiser's phone based on the advertiser phone number, and wherein the server does not charge a fee for the call unless the call to the advertiser's phone is connected.

2. The call receiving device according to claim 1, further comprising a discrimination information generation part configured to generate the discrimination information upon each occurrence of receiving of each of the calls.

3. The call receiving device according to claim 1,
wherein the predetermined device comprises a computer and the discrimination information receiving part is configured to receive the discrimination information input through an Internet using the computer; and
wherein the call related information sending part is configured to send the call related information associated with the discrimination information through the Internet to the computer.

4. The call receiving device according to claim 1, wherein the call related information comprises at least one of client information to identify the web page and merchandise information to identify merchandise that is provided by the call receiver in relation to the identification information.

5. The call receiving device according to claim 1, wherein the discrimination information sending part is configured to send the discrimination information to the call receiver by voice.

6. A call receiving method comprising:
acquiring identification information using a server by receiving calls each made based on the identification information, which is configured with a server identification number and an advertisement identification number, by receiving calls each made based on the identification information that is explicitly or implicitly provided in a web page and that identifies a call receiver;
associating the acquired identification information with discrimination information which is configured with numeric information with two digits or less and word information with three characters or less, each being simple and including a small amount of information to discriminate each of the calls;
connecting each of the calls to the call receiver;
sending the discrimination information to the call receiver through the call connected to the call receiver;
receiving the discrimination information input into a predetermined device; and
sending, to the predetermined device, call related information indicated by the identification information associated with the discrimination information,
wherein the server has a function to be connected to the call based on the server identification number to acquire an input identification information without receiving a phone call pass, to acquire an advertiser phone number based on the input identification information, and to call an advertiser's phone based on the advertiser phone number, and wherein the server does not charge a fee for the call unless the call to the advertiser's phone is connected.

7. The call receiving method according to claim 6, wherein the discrimination information is configured with three hiragana characters or less.

8. The call receiving device according to claim 1, wherein the discrimination information is configured with three hiragana characters or less.

* * * * *